(12) United States Patent
Tan et al.

(10) Patent No.: US 6,751,510 B1
(45) Date of Patent: Jun. 15, 2004

(54) PREDICTIVE AND SELF-TUNING PI CONTROL APPARATUS FOR EXPANDED PROCESS CONTROL APPLICATIONS

(75) Inventors: Kok Kiong Tan, Singapore (SG); Tong Heng Lee, Singapore (SG); Sunan Huang, Singapore (SG); Qing Guo Wang, Singapore (SG)

(73) Assignee: The National University of Singapore, Singapore (SG)

( * ) Notice: Subject to any disclaimer, the term of this patent is extended or adjusted under 35 U.S.C. 154(b) by 0 days.

(21) Appl. No.: 09/869,355
(22) PCT Filed: Dec. 6, 1999
(86) PCT No.: PCT/SG99/00138
§ 371 (c)(1),
(2), (4) Date: Nov. 8, 2001
(87) PCT Pub. No.: WO00/41043
PCT Pub. Date: Jul. 13, 2000

(30) Foreign Application Priority Data

Dec. 30, 1998  (SG) .............................................. 9804845

(51) Int. Cl.[7] .............................................. G05B 13/02
(52) U.S. Cl. ............................ 700/41; 700/28; 700/31; 700/37; 700/42; 700/45; 318/609; 318/610
(58) Field of Search ................... 700/28–31, 37, 700/40, 41, 42, 43, 44, 45, 35; 318/609, 610

(56) References Cited

U.S. PATENT DOCUMENTS

| | | | |
|---|---|---|---|
| 4,768,143 A | | 8/1988 | Lane et al. |
| 5,185,800 A | * | 2/1993 | Mahieux ..................... 704/500 |
| 5,347,446 A | * | 9/1994 | Iino et al. ..................... 700/29 |
| 5,394,322 A | * | 2/1995 | Hansen ........................ 700/37 |
| 5,404,289 A | | 4/1995 | Hang et al. |
| 5,847,952 A | * | 12/1998 | Samad ......................... 700/48 |
| 6,154,499 A | * | 11/2000 | Bhaskar et al. ............. 375/259 |

* cited by examiner

Primary Examiner—Ramesh Patel
(74) Attorney, Agent, or Firm—Birch, Stewart, Kolasch & Birch, LLP

(57) ABSTRACT

A predictive and self-tuning PI controller includes an apparatus for variably assigning gains thereto in accordance with specified time functions following a change in set-point. The control gains are computed in accordance with a plurality of input parameters and subsequently continuously adjusted to set-point errors based on a GPC approach thereby to optimize performance indices derived from simple and classical user specifications. Variation and tuning of control gains in accordance with set-point errors permits the PI controller to be useful in the general area of process control and applicable to a wider range of processes compared to traditional PI control, including time-delay processes, unstable processes and processes with time-varying dynamics.

17 Claims, 3 Drawing Sheets

Fig. 1 : Prior Art PI Control Structure

PREDICTIVE AND SELF-TUNING PI CONTROL APPARATUS FOR EXPANDED PROCESS CONTROL APPLICATIONS

This application is the national phase under 35 U.S.C. §371 of PCT International application Ser. No. PCT/SG99/00138 which has an International filing date of Dec. 6, 1999, which designated the United States of America and was published in English.

FIELD OF THE INVENTION

This invention generally relates to the field of process control, and more particularly to a predictive and self-tuning PI (Proportional plus Integral) control design which enhances the performance achievable with conventional PI control while capitalizing on the strong user-support established and available for a simple PI control structure.

BACKGROUND OF THE INVENTION

PI control has existed for more than fifty years. The current methodology in tuning a PI controller has been essentially to deduce and infer a set of fixed control gains from the characteristics of the process. Over the years, the control gains tuning process has evolved from simple and heuristic procedures to more elaborate and exact computations based on mathematical models of the process, resulting in increasing performance yields.

However, whichever inferencing procedure is used, the resultant control gains derived thereby are mostly fixed. As specifications on control performance are tightened by requirements for increased precision with greater complexity of processes being controlled, the fixed nature of the control gains has direct implications on the range of processes for which the known PI control structure continues to be applicable and useful. For example, the conventional fixed-gains PI controller is well-known to be inadequate for a number of classes of linear systems, including: time-delay processes, unstable processes, and processes with time-varying parameters.

Advanced and more complex control methods may be recommended for these systems. However, such methods require more structurally-elaborate devices which, in themselves, act as a dis-incentive to adoption and utilization. Moreover, there remains the decades-old dilemma that has been facing hordes of control engineers, in that under real working conditions (e.g., including model imperfections, modest process operators, limited availability of technical support, short breakdown recovery tolerance, etc), the benefits of advanced control over PI control have never been quite obtainable. This is one main reason as to why the traditional approach to PI control remains widely used despite the clear limitations associated therewith.

OBJECTS OF THE INVENTION

It is accordingly an object of the present invention to overcome the limitations of prior art PI controls.

It is a more specific object of the invention to provide improvements over traditional forms of PI control in a novel control apparatus which retains the conventional PI control structure, and thereby to capitalize on the massive user-support established for PI controllers over the decades.

It is still a more particular object of the invention to provide a novel method of and apparatus for control gains-tuning and continuous self re-tuning of control parameters of a process based on a GPC (Generalized Predictive Control) approach to optimize performance indices.

It is yet a more detailed object of the invention to provide a predictive and self-tuning PI controller.

It is still a more specific object of the invention to provide a predictive and self-tuning PI control apparatus which expands the domain of PI control applications to include time-delay processes, unstable processes, and time-varying processes.

It is thus an object of the invention to provide an improved PI controller which, by utilizing a predictive and self-tuning approach to control, is unified in design for different classes of processes, is applicable to a broader range of linear processes than the prior art, and yields performance improvements beyond traditional fixed-gains PI control.

SUMMARY OF THE INVENTION

In accordance with the foregoing objects, the present invention provides a novel predictive and self-tuning PI controller, which optimizes performance indices derived from simple and classical user specifications.

In accordance with another feature of the invention, there is provided a method for designing a predictive and self-tuning PI controller which is based on a GPC design approach.

In accordance with the invention, there is thus provided a control apparatus having a design which is naturally amenable to optimal control applications.

In accordance with another aspect of the invention, there is provided a control apparatus having inherent predictive and self-tuning capabilities which expand the PI control application domain to include time-delay processes, unstable processes, and time-varying processes.

In accordance with a more specific feature of the invention, there is provided a control apparatus comprising a novel combination of components, including a control structure similar to a conventional PI control, and a plurality of novel elements, including a gains design means, a gains scheduling means, and a gains self-tuning means.

In accordance with another aspect of the invention, there are provided novel design, scheduling and self-tuning algorithms for the gains of a PI controller, and apparatus for implementing the same.

In accordance with yet another feature of the invention, there is provided a control apparatus including a PI process controller and a gains design means for designing gains of the process controller, the gains design means being responsive to a user specified parameter set including parameters representing a first-order mathematical model of the process, a parameter representing an estimate of a time-delay of the process, parameters representing a desired closed-loop damping factor and natural frequency, and a sampling interval, and which, in response to the input parameters specified by the user, generates a plurality of time functions associating the PI control gains to the input parameters.

It is still another feature of the invention that the user specified parameter set which is input to the gains design means may include an optional prediction horizon and that, when the optional prediction horizon is unspecified, the gains design means recommends a default prediction horizon.

In accordance with a more detailed feature of the invention, the control apparatus also includes a gains scheduling means for assigning appropriate gains to the PI controller based on a schedule, the schedule depending on elapsed time following a set-point change according to the time functions generated by the gains design means. The gains scheduling means is further responsive to a set-point signal defining a desired process variable, and outputs are the actual time-scheduled gains to be assigned to and updated on the PI controller.

In accordance with still a more detailed feature of the invention, the control apparatus further includes a gains self-tuning means for continuously adjusting weighting parameters of the time functions generated by the gains design means to optimize performance of the PI process controller. The gains self-tuning means is further responsive to a set-point error which is the difference between the desired and actual process variables. The outputs from the self-tuning component are a set of replacement weighting parameters for the time functions generated by the gains design means.

The foregoing and other objects, features, aspects and advantages of the present invention will become more apparent from the following detailed description of the present invention when taken in conjunction with the accompanying drawings.

BRIEF DESCRIPTION OF THE DRAWINGS

A preferred embodiment of the present invention is illustrated by way of example, and not by way of limitation, in the accompanying figures of the drawings which are incorporated into and form a part of the specification and in which like reference numerals refer to similar elements, and which, together with the description, serve to explain the principles of the invention. In the drawings

DETAILED DESCRIPTION OF THE PREFERRED EMBODIMENTS OF THE INVENTION

Described herein is a method and apparatus for improving precision of control of a process. For purposes of explanation, the following description sets forth numerous specific details in order to provide a thorough understanding of the present invention, including for example varying gains of a PI process controller in a predictive and self-tuning manner. In an exemplary embodiment of the present invention and in accordance with the objects and features thereof, there is provided a novel process control apparatus comprising a PI controller, a control gains design means, a control gains scheduling means and a control gains self-tuning means.

However, it should become apparent to those skilled in the art to which the invention pertains that the present invention may be practiced without, or by variation of, various ones of the specific details disclosed herein. For example, although the presently preferred embodiment is applied to variation of gains of a PI controller in a predictive and self-tuning manner, it should be appreciated that the inventive concept may also be applied to other forms of controllers, and specifically to controllers which are not ordinarily classified as PI controllers.

In other instances, well-known structures and devices are shown in block diagram form in order to avoid unnecessarily obscuring the concepts of the invention.

Although the theory underlying an invention is not necessarily relevant to questions of patentability, it is noted that the invention utilizes several mathematically described concepts. Accordingly, prior to providing the detailed disclosure of the invention, the mathematical concepts used in the inventive control apparatus will first be presented herein. The following mathematical proceedings implicitly define all the mathematical notations subsequently used in describing the invention, and explain the actual implications of the equations contained in the Appendix included herein, which are utilized in the invention.

Figure 1:
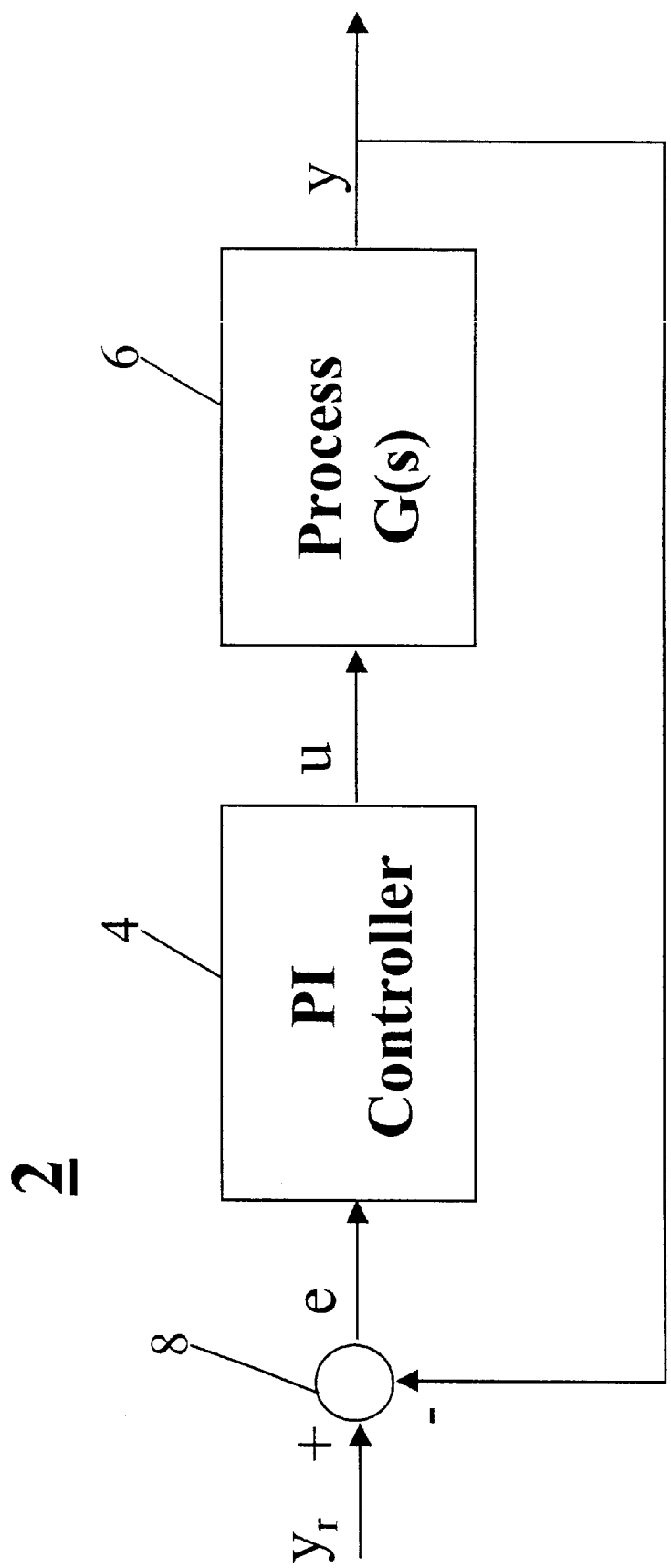
FIG. 1 is a block diagram of a prior art PI control structure.

Referring now to FIG. 1, as shown therein a known prior art unity feedback control system 2 includes a PI Controller 4 for controlling a particular process 6, the process represented by a transfer function G(s). In the known configuration, a set-point value $y_r$ is inputted to the system 2 and it is desired to obtain an output process variable y corresponding thereto. A signal representing the process variable y is fed back from the output of process 6 and the difference between the set-point $Y_r$ and the process variable y is obtained at a summer 8. The difference, representing an error e between the input and output of the system, is then provided as an input to the PI controller 4 which provides a control signal u to process 6. PI controller 4 is described by a number of characteristic features, known in the art, such as gains, delays and transient responses thereof.

In the process control industry, a large class of processes controlled by feedback control systems such as described herein exhibit, and are defined by, a monotonic input-output transient response characteristics which can be approximated by a first-order-plus-time delay transfer function model, described as:

$$G(s) = \frac{b}{s+a} e^{-Ls} \quad (1)$$

In a control system of the type shown in FIG. 1 the external set-point does not affect the feedback design. Accordingly, for feedback design considerations it is appropriate to set $y_r$ to zero. It then follows that $$(s+a)e = -be^{-Ls}u$$

which is equivalent to the time domain equation:

$$\dot{e} = -ae - bu(t-L) \quad (2)$$

The presently preferred embodiment of the invention incorporates a digital, sampled, implementation. However, any feasible embodiment may be implemented and is within the scope of the invention. Accordingly, to provide a basis for appreciating various features of the invention, the following description with respect to the prior art of FIG. 1 and to the concepts of the invention, is presented from a sampled data perspective. The preferred embodiment of the present invention is similarly provided as a digital embodiment the advantages of which will thus be more readily appreciated over the prior art.

For digital considerations and implementation of the control system of FIG. 1, the z transform of Eq. (2) is taken to provide a difference equation. Upon applying the z transform to Eq. (2) there results the following corresponding discrete equation (3):

$$e(k+1) = a'e(k) - b'u(k-h) \quad (3)$$

where $a' = e^{-aT_s}$, $b' = (b/a)(1 - e^{-aT_s})$, $T_s$ denotes the sampling interval, k denotes the $k^{th}$ sample, and h=round(L/Ts), where (round(arg) is a mathematical operator rounding the argument arg to the nearest integer).

The discrete equivalent PI controller of FIG. 1 is described by $$u(k) = k_p e(k) + k_i \sum_{i=0}^{k-1} e(i) \quad (4)$$

where $k_p$ and $k_i$ are the control gains. Upon defining $$\theta(k) = \sum_{i=0}^{k-1} e(i)2(k),$$

it then follows that $$\theta(k+1) = \theta(k) + e(k) \quad (5)$$

If the system states are chosen as $x = [2, e]^T$, a state equation equivalent to Eq. (3) is obtained as:

$$x(k+1) = Fx(k) + Bu(k-h) = \begin{pmatrix} 1 & 1 \\ 0 & a' \end{pmatrix} x(k) + \begin{pmatrix} 0 \\ -b' \end{pmatrix} u(k-h) \quad (6)$$

Clearly, both states are available and the state feedback of Kx(k) is simply PI control, where $K = [k_p; k_i]$. The foregoing describes a control structure which is essentially a conventional PI control structure of the prior art.

A novel aspect of the present invention is provided in the manner in which the control gains of the PI Controller are designed, time-scheduled and self-tuned. This aspect is described in the following, with appropriate reference to the drawing is Figures.

A theoretical derivation of a GPC solution for time-delay systems is provided by the inventors in an internal document (Tan. K. K., T. H. Lee, S. N. Huang and X. Jiang, *Optimal PI Control for Time-Delay Systems Based on a GPC Approach*, Internal Report #EE-CNTL-98-01. National University of Singapore, 1998.) the contents of which are incorporated herein by reference. The solution may be applied to the control system to minimize a cost function defined by:

$$J = \sum_{l=1}^{P} \|x(k+l)\|_{Q(l)}^2 + \|u(k)\|_r^2 \quad (7)$$

where r is the control weight, $Q = \text{diag}(q_1, q_2)$ is the output weighting matrix, and P is the prediction horizon.

The resultant PI control gains are given as $$(k_i, k_p) = -(B^T A^T Q A B + r)^{-1} B A^T Q A F^{k+1} \quad 0 < k \leq h, \quad (8)$$

$$(k_i, k_p) = -(B^T A^T Q A B + r)^{-1} B A^T Q A F [F - B(B^T A^T Q A B + r)^{-1} B^T A^T Q A F]^h \quad k \geq h \quad (9)$$

where $$A = \begin{bmatrix} I \\ F \\ \vdots \\ F^{P-1} \end{bmatrix} \quad (10)$$

Direct simplification of (8) and (9) yields the following explicit gains as a function of time sample:

For k<h, $$k_i(k) = \frac{q_1 b' g_1}{q_1 b'^2 (g_2 + g_3 \bar{q}_2) + r} \quad (11)$$

$$k_p(k) = \frac{q_1 b' \left( g_1 \frac{a'^{k+1} - 1}{a' - 1} + g_2 a'^{k+1} + g_3 \bar{q}_2 a'^{k+1} \right)}{q_1 b'^2 (g_2 + g_3 \bar{q}_2) + r} \quad (12)$$

and for $k \geq h$, $$k_i(k) = \frac{q_1 b' [g_1 f_{11}(h) + (g_1 + g_2 a' + g_3 \bar{q}_2 a') f_{21}(h)]}{q_1 b'^2 (g_2 + g_3 \bar{q}_2) + r} \quad (13)$$

$$k_p(k) = \frac{q_1 b' [g_1 f_{12}(h) + (g_1 + g_2 a' + g_3 \bar{q}_2 a') f_{22}(h)]}{q_1 b'^2 (g_2 + g_3 \bar{q}_2) + r} \quad (14)$$

where $$g_1 = \frac{a'^P - a'}{(a'-1)^2} - \frac{P-1}{(a'-1)} \quad (15)$$

$$g_2 = \frac{a'^{2P} - 2a'^{P+1} - 2a'^P - a'^4 + 2a'^3 + 2a'^2}{(a'^2 - 1)(a' - 1)^2} + \frac{a'^{2P} - 1}{a'^2 - 1} + \frac{P-2}{(a'-1)^2}$$

$$g_3 = \frac{a'^{2P} - 1}{a'^2 - 1}$$

and $$\begin{bmatrix} f_{11}(h) & f_{12}(h) \\ f_{21}(h) & f_{22}(h) \end{bmatrix} = [F - B(B^T A^T Q A B + r)^{-1} B^T A^T Q A F]^h \quad (16)$$

The weighting parameters are related to the desired closed-loop damping factor $\xi$ and natural frequency $\omega_n$ by the following equations (17)–(18)

$$q_1 = \frac{\left[1 - 2e^{-\xi \omega_n T} \cos(\omega_n \sqrt{1-\xi^2} T) + e^{-2\xi \omega_n T}\right] a' r}{b'^2 g_1 e^{-2\xi \omega_n T}} \quad (17)$$

$$q_2 = \frac{(a' - e^{-2\xi \omega_n T}) g_1 - \left[1 - 2e^{-\xi \omega_n T} \cos(\omega_n \sqrt{1-\xi^2} T) + e^{-2\xi \omega_n T}\right] a' (g_2 - g_3) r}{b'^2 g_1 g_3 e^{-2\xi \omega_n T}} \quad (18)$$

After the PI controller is commissioned accordingly as described above, the parameters $q_1$ and $q_2$ can be continuously adapted for optimal control performance using the following equations obtained from a gradient search method:

$$q_1^{k+1} = q_1^k - \beta_1 \frac{\partial J}{\partial q_1}, \quad (19)$$

$$q_2^{k+1} = q_2^k - \beta_2 \frac{\partial J}{\partial q_2}, \quad (20)$$

where $$\frac{\partial J}{\partial q_1} = e(k)\frac{\partial e(k)}{\partial q_1}$$

$$= -\frac{b'^4 g_1 g_3(q_2 - q_1) + b'^2 r g_1}{[q_1 b'^2(g_2 - g_3) + q_2 b'^2 g_3 + r]^2}\sum_{i}^{k-2} e(i)e(k)$$

$$-\frac{b'^4 g_1 g_3(q_2 - q_1) + r b'^2 g_1 + a' r b'^2 g_2}{[q_1 b'^2(g_2 - g_3) + q_2 b'^2 g_3 + r]^2} e(k-1)e(k),$$

$$\frac{\partial J}{\partial q_2} = e(k)\frac{\partial e(k)}{\partial q_2}$$

$$= -\frac{q_1 b'^4 g_1 g_3}{[q_1 b'^2(g_2 - g_3) + q_2 b'^2 g_3 + r]^2}\sum_{i}^{k-2} e(i)e(k)$$

$$-\frac{a' b'^2 r g_3 - q_1 b'^2 r g_1 g_3}{[q_1 b'^2(g_2 - g_3) + q_2 b'^2 g_3 + r]^2} e(k-1)e(k),$$

and $\beta_1$, $\beta_2$ are small adaptation gains.

Figure 2:
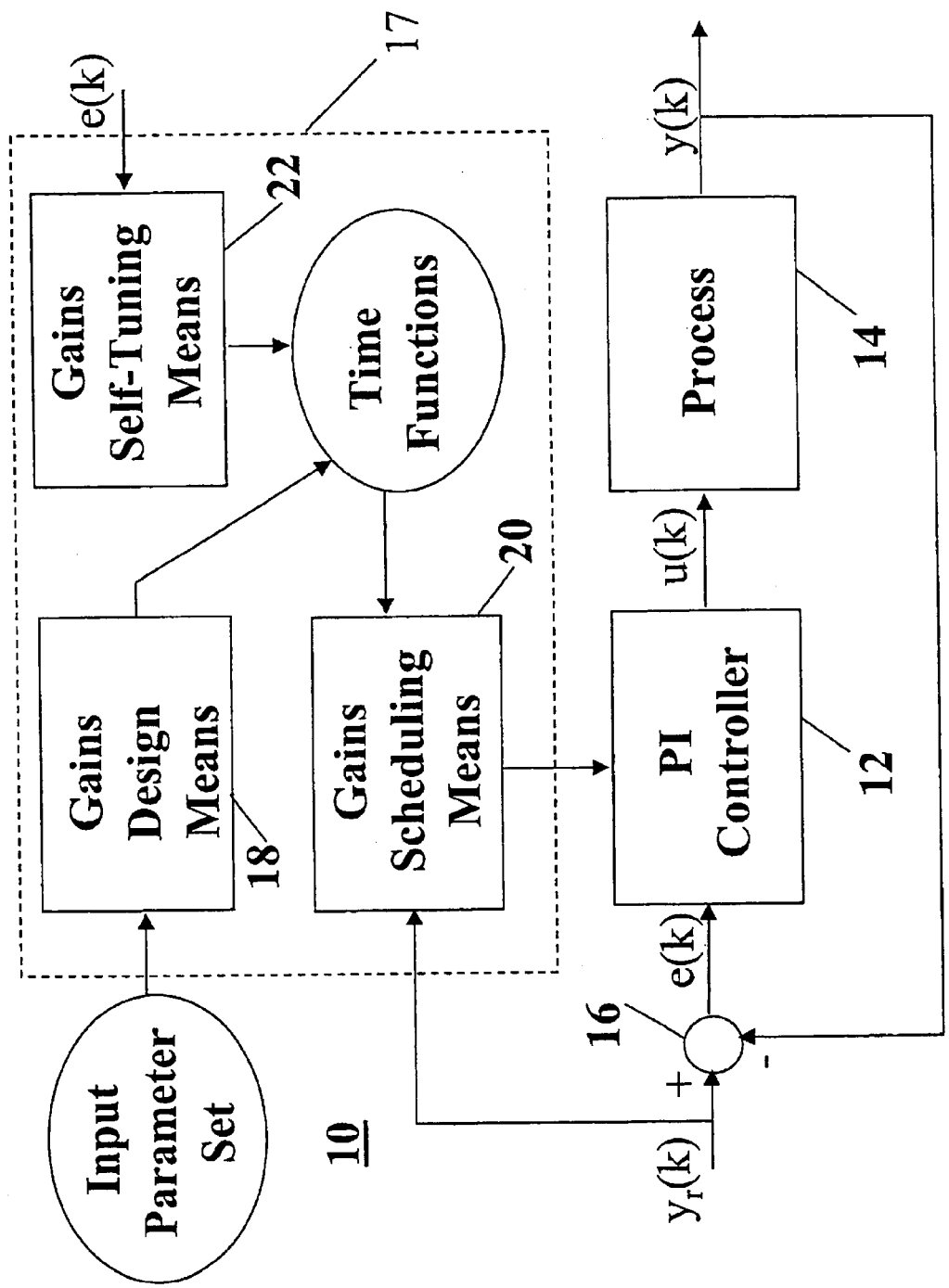
FIG. 2 is a block diagram of an embodiment of the inventive control apparatus.

The present invention provides a structure, configured as illustrated in the example of FIG. 2 for example, which implements the foregoing mathematical concepts as a control apparatus which is both nominally and robustly stable.

Referring now to FIG. 2, shown therein is a PI control apparatus 10 incorporating the inventive control gains design method, gains scheduling method and gains self-tuning method. More specifically, FIG. 2 shows a digital implementation of PI control apparatus, in block diagram form. Reference numeral 12 represents a PI controller which responds to the various signals inputted thereto. At the $k^{th}$ sample time, the process variable y(k) of a process 14 and the set-point $y_r(k)$ are input to a summing element 16. As seen in the Figure, the process variable y(k) is input to an inverting (subtracting) input of element 16. Similarly to the prior art illustrated in FIG. 1, the output e(k) of summing element 16 thus representing a difference between the set-point $y_r(k)$ and the process variable y(k). The output of the summing element 16 is input to the PI controller 12. The PI controller outputs a signal u(k) in response to the signal e(k) in accordance with equation (4). The output signal u(k) is input to the process 14. This aspect of the PI control structure shown in FIG. 2 is thus in conformity with the prior art of FIG. 1.

However, in accordance with the invention, the PI controller 12 and associated control structure is provided in a novel combination with a variable gain element 17, including number of additional components shown in FIG. 2. These additional components are enclosed in the variable gain element 17, shown in the Figure as a dotted box, a detailed description of which is provided as follows.

As shown in FIG. 2, the variable gain element 17 includes a gains design means 18 which receives as inputs thereto a user-specified parameter set. In accordance with one embodiment of the invention, the parameter set includes a) parameters (a, b) of a first-order mathematical model of the process;

b) a parameter (L) representing the time delay of the process;

c) parameters (., $T_n$) representing the desired closed-loop damping factor and natural frequency;

d) a parameter ($T_s$) representing the sampling interval of the data acquisition system; and e) an optional parameter (P) representing the prediction horizon.

It will be appreciated, however, that although a specific set of parameters has been described, the specific parameters do not necessarily define the invention. Thus, fewer parameters than hereinabove described, additional parameters, or other parameters may be inputted to the gains design means 18 without departing from the scope of the present invention.

In response to the input parameter set, gains design means 18 produces a set of time functions, generally shown as ∂, relating the control gains $k_p$ and $k_i$ to the input parameter set and the elapsed time sample following a change in the set-point signal $y_r(k)$. These time functions are given in equations (24)–(27) in Table 1 of the attached Appendix. If the optional prediction horizon P parameter is not specified by the user, the gains design means will automatically recommend, or generate, a default prediction horizon value. In the example of the invention embodied herein, the default prediction horizon parameter generated by gains design means 18 is P=10.

In that regard, it should also be recognized that it is in accordance with the concept of the present invention that any of the parameters may be replaced by a default parameter, whether generated by gains design means 18 or any other device, when such a parameter is not input to the inventive apparatus.

The generated time functions ∂ and the set-point signal $y_r(k)$ are provided as inputs to a gains scheduling means 20 in the block diagram of FIG. 2. By inputting $y_r(k)$ to the gains scheduling means 20, the invention allows the gains scheduling means to track the elapsed time following a change in set-point. The gains scheduling means 20 sets and adjusts the PI control gains according to the time functions ∂ generated by gains design means 18.

Throughout operation of the invention, the error signal e(k) is input to a gains self-tuning means 22. The gains self-tuning means adapts the parameters $q_1$ and $q_2$ of the time functions according to equations (30)–(31) contained in Table 2 of the attached Appendix. Default small adaptation gains of $\beta_1 = \beta_2 = 0.00001$ are used.

As hereinabove noted, preferably the control apparatus of the present invention is physically implemented by means of a microprocessor/digital-computer (not shown) using known techniques to implement various aspects of the above described functions. However, as will be appreciated by those of ordinary skills in the art, analog electronic circuits may be used to fulfill many objects of the invention.

For the preferred digital implementation of the control apparatus, an interface between the (digital) controller apparatus and the analog (input) measurements and actuator (output) signals uses known analog-to-digital and digital-to-analog converters, respectively, in the same manner as used by conventional digital controllers. Accordingly, the present disclosure omits description of such converters.

Similarly, the functions of the PI controller 12, the gains design means 18, the gains scheduling means 20 and the gains self-tuning means 22 described herein are preferably implemented in software as a program (stored in a Programmable Read Only Memory of the microprocessor/digital-computer, for example) for processing the stored data representing the converted input and output signals. Such a program may be stored in volatile or non-volatile memory, which may be randomly or sequentially accessed, and which may be read only or writable.

Preferably, the input parameter set, time functions and other data variables are held in a Random Access Memory (not explicitly shown herein) of the microprocessor/digital computer. The software used for this purpose by the present invention is the same as in other digitally implemented controllers and, accordingly, a detailed description thereof is omitted.

The following example is provided by way of illustrations of applications of he invention. More specifically, the following provides a simulation example using he inventive control apparatus. A high-order system is considered and given by $$G(s) = \frac{1}{(s+1)^{10}} \quad (21)$$

The first-order model for the process obtained from standard least-squares identification method is:

$$\frac{1}{1 + 2.72s} e^{-7.69s} \quad (22)$$

The user input parameter set is
a=0.37,
b=0.37,
L=7.69,
$\xi$=1,
$T_n$=0.19,
$T_s$=0.001,
P=10.

For comparison of the control performance, a well-known reported fixed-gain PI control is employed. The PI parameters for the proposed controller are computed to be $$\left. \begin{array}{l} k_i(k) = 0.0003, \\ k_p(k) = 0.081 - 0.0774 \times 0.9963^k \end{array} \right\} 0 \leq k < 769,$$

$$\left. \begin{array}{l} k_i(k) = 0.0638, \\ k_p(k) = 0.000199 \end{array} \right\} k \geq 769,$$

while the control parameters of the fixed-gains PI control are $$k_i(k) = 0.1061,$$
$$k_p(k) = 0.00039012. \quad (23)$$

Figure 3:
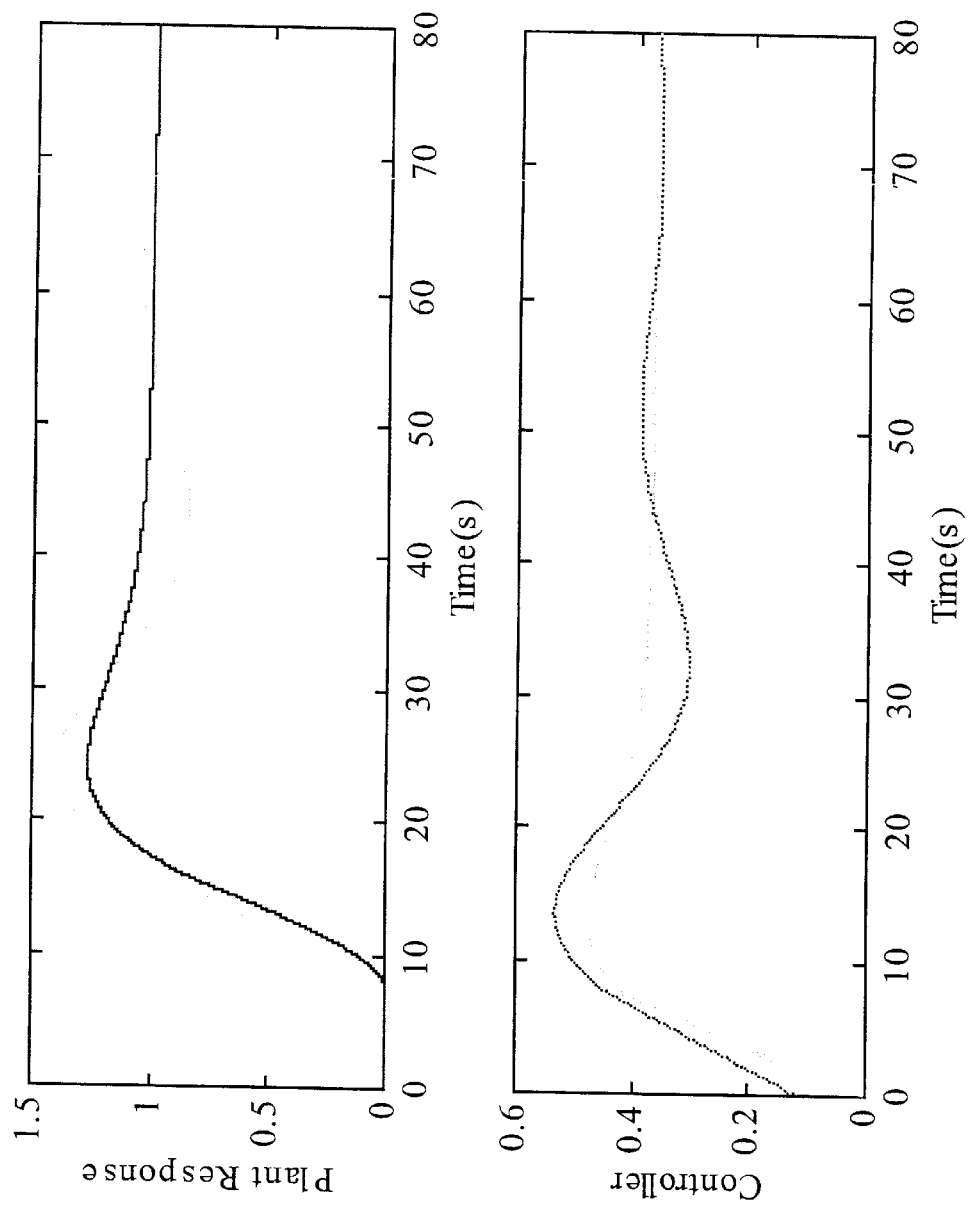
FIG. 3 shows an illustrative example obtained by using the inventive control apparatus.

FIG. 3 shows a response characteristic for the foregoing example. As apparent therefrom, the closed-loop response shown therein demonstrates that the inventive PI controller has a much better performance.

The foregoing description of the preferred embodiment of the invention has been presented for purposes of illustration and description. It is not intended to be exhaustive or to limit the invention to the precise forms disclosed, since many modifications or variations thereof are possible in light of the above teaching.

For example, although the presently preferred embodiment is described in terms of user inputted parameters, it should be appreciated that such parameters may be input to the inventive apparatus from another device, such as from a computer responding to environmental parameters, from another process controller, or from any other source. Moreover, although the illustrative embodiment of the invention disclosed herein is applied to variation of gains of a PI controller in a predictive and self-tuning manner, it should be appreciated that the inventive concept may also be applied to other forms of controllers, and specifically to controllers which are not ordinarily classified as PI controllers.

These and any other such modifications and variations are within the scope of the invention without departing from the broader spirit and scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled. The specification and drawings are, accordingly, to be regarded in an illustrative rather than a restrictive sense.

Appendix

TABLE 1

Time functions for PI control gains

For $0 \leq k < h$, $$k_i(k) = \frac{q_1 b^1 g_1}{q_1 b'^2 (g_2 + g_3 \bar{q}_2) + r}, \quad (24)$$

$$k_p(k) = \frac{q_1 b' \left( g_1 \frac{(a'^{k+1} - 1)}{(a' - 1)} + g_2 a'^{k+1} + g_3 \bar{q}_2 a'^{k+1} \right)}{q_1 b'^2 (g_2 + g_3 \bar{q}_2) + r}, \quad (25)$$

and for $k \geq h$, $$k_i(k) = \frac{q_1 b' [g_1 f_{11}(h) + (g_1 + g_2 a' + g_3 \bar{q}_2 a') f_{21}(h)]}{q_1 b'^2 (g_2 + g_3 \bar{q}_2) + r}, \quad (26)$$

$$k_p(k) = \frac{q_1 b' [g_1 f_{12}(h) + (g_1 + g_2 a' + g_3 \bar{q}_2 a') f_{22}(h)]}{q_1 b'^2 (g_2 + g_3 \bar{q}_2) + r}, \quad (27)$$

where $$q_1 = \frac{\left[ 1 - 2e^{-\xi \omega_n T} \cos\left(\omega_n \sqrt{1 - \xi^2} T\right) + e^{-2\xi \omega_n T} \right] a' r}{b'^2 g_1 e^{-2\xi \omega_n T}} \quad (28)$$

$$q_2 = \frac{(a' - e^{-2\xi \omega_n T}) g_1 - \left[ 1 - 2e^{-\xi \omega_n T} \cos\left(\omega_n \sqrt{1 - \xi^2} T\right) + e^{-2\xi \omega_n T} \right] a' (g_2 - g_3) r}{b'^2 g_1 g_3 e^{-2\xi \omega_n T}} \quad (29)$$

TABLE 2

Adaptation of time function parameters $$q_1^{k+1} = q_1^k - \beta_1 \frac{\partial J}{\partial q_1}, \quad (30)$$

$$q_2^{k+1} = q_2^k - \beta_2 \frac{\partial J}{\partial q_2}, \quad (31)$$

where $$\frac{\partial J}{\partial q_1} = e(k) \frac{\partial e(k)}{\partial q_1}$$

$$= -\frac{b'^4 g_1 g_3 (q_2 - q_1) + b'^2 r g_1}{[q_1 b'^2 (g_2 - g_3) + q_2 b'^2 g_3 + r]^2} \sum_i^{k-2} e(i) e(k) -$$

$$\frac{b'^4 g_1 g_3 (q_2 - q_1) + (rb)'^2 g_1 + a' rb'^2 g_2}{[q_1 b'^2 (g_2 - g_3) + q_2 b'^2 g_3 + r]^2} e(k - 1) e(k),$$

TABLE 2-continued

Adaptation of time function parameters $$\frac{\partial J}{\partial q_2} = e(k)\frac{\partial e(k)}{\partial q_2}$$

$$= -\frac{q_1 b'^4 g_1 g_3}{[q_1 b'^2 (g_2 - g_3) + q_2 b'^2 g_3 + r]^2} \sum_{i}^{k-2} e(i)e(k) -$$

$$\frac{a' b'^2 r g_3 - q_1 b'^2 r g_1 g_3}{[q_1 b'^2 (g_2 - g_3) + q_2 b'^2 g_3 + r]^2} e(k-1)e(k),$$

$\beta_1, \beta_2$ are small adaptation gains.

The various notations of the equations are accordingly defined in "Notations and essential proceedings" under the section "Description of the embodiments of the invention".

What is claimed is:

1. A process control system for controlling a process including:
    input means for inputting a first signal representing a set-point for a process and a second signal representing a process variable;
    a summer generating an error signal representing a difference between said first and second signals;
    a controller connected to provide a control signal for the process as a function of said error signal and of control gains thereof; and
    an associated control structure providing signals to said controller, said associated control structure providing predictive gain values for said controller and self tuning gains of said controller.

2. The process control system of claim 1, wherein said associated control structure comprises gain design means responsive to an input parameter set from a user and generating a time function signal for controlling gains in accordance with said input parameter set.

3. The process control system of claim 2, wherein said input parameter set includes parameters representing at least one of: a first-order mathematical model of the process, a parameter representing an estimate of a time-delay of the process, parameters representing a desired closed-loop damping factor and natural frequency, and a sampling interval and wherein said gain design means generates said time function signal in response to each parameter of said parameter set input thereto.

4. The process control system of claim 3, wherein said input parameter set further includes a prediction horizon.

5. The process control system of claim 4, wherein said gain design means generates a default prediction horizon and replaces said default prediction horizon by said prediction horizon when included in said input parameter set.

6. The process control system of claim 3, further comprising gains scheduling means, said gains scheduling means responding to said set-point and to a schedule depending on elapsed time following a set-point change for assigning gains to said controller in accordance with said time function signal generated by said gain design means, whereby time scheduled gains are assigned to said controller.

7. The process control system of claim 6, further comprising gains self-tuning means, said gains self-tuning means responding to a difference between said set-point signal and a controlled process variable for repeatedly adjusting weighting parameters of said time function signal to optimize control performance and for providing a weighting parameter adjusted time function signal to said time scheduled gains scheduling means for self-tuning gains assigned to said controller.

8. The process control system of claim 2, further comprising gains self-tuning means, said self-tuning means responding to a difference between said set-point signal and a controlled process variable for repeatedly adjusting weighting parameters of said time function signal to optimize control performance and for providing a weighting parameter adjusted time function signal to said time scheduled gains scheduling means for self-tuning gains assigned to said controller.

9. The process control system of claim 8, further comprising gains scheduling means, said gains scheduling means responding to said set-point signal and to a schedule depending on elapsed time following a set-point change for assigning gains to said controller in accordance with said time function signal generated by said gain design means, whereby time scheduled gains are assigned to said controller.

10. The process control system of claim 9, further comprising gains self-tuning means, said self-tuning means responding to a difference between said set-point signal and a controlled process variable for repeatedly adjusting weighting parameters of said time function signal to optimize control performance and for providing a weighting parameter adjusted time function signal to said time scheduled gains scheduling means for self-tuning gains assigned to said controller.

11. The process control system of claim 10, wherein said input parameter set includes parameters representing each of: a first-order mathematical model of the process, a parameter representing an estimate of a time-delay of the process, parameters representing a desired closed-loop damping factor and natural frequency, and a sampling interval and wherein said gain design means generates said time function signal in response to each parameter of said parameter set input thereto.

12. A PI control apparatus comprising:
    input means for inputting a first signal representing a set-point for a process and a second signal representing a process variable;
    means for generating an error signal representing a difference between said first and second signals;
    control means for providing a signal to the process as a function of said error signal and of control gains thereof;
    gain design means receiving a user input parameter set and generating time functions relating the control gains to at least one input parameter of said input parameter set and to elapsed time following a set-point change;
    gains scheduling means for updating the PI control gains based on said elapsed time according to a time schedule depicted by said time functions; and
    gains self-tuning means for continuously updating and fine tuning parameters of said time functions based on said error signal.

13. The PI control apparatus as recited in claim 12, wherein said user input parameter set comprises:
    two parameters (a, b) of a first-order mathematical model of the process;
    one parameter (L) representing a time delay of the process;
    two parameters ($\xi$, $\omega_n$) representing a desired closed-loop damping factor and natural frequency;
    one parameter ($T_s$) representing a sampling interval of the data acquisition system; and one optional parameter (P) representing a prediction horizon.

14. The PI control apparatus as recited in claim 12, wherein the said time functions are given in the equations (24)–(27) of Table 1.

15. The PI control apparatus as recited in claim 13, wherein said gains design means assigns said optional parameter representing the prediction horizon a default value of 10 when said optional parameter is unspecified.

16. The PI control apparatus as recited in claim 12, wherein a first pair of time functions are used in generating the PI control gains if said elapsed time is less than said time delay, and a second pair of time functions different from said first pair of time functions are used in generating the PI control gains if said elapsed time is more than said time delay.

17. The PI control apparatus as recited in claim 12, wherein the parameters of said time functions are updated according to equations (30)–(31) in Table 2, and default adaptation gains of $\beta_1=\beta_2=0.00001$ are used therein.

* * * * *